US006129966A

United States Patent [19]

Narita et al.

[11] Patent Number: 6,129,966

[45] Date of Patent: Oct. 10, 2000

[54] IMAGE-RECEIVING SHEET

[75] Inventors: Mikiko Narita; Haruo Takeuchi; Shunichi Ebihara; Kouichi Nakamura, all of Tokyo-To, Japan

[73] Assignee: Dai Nippon Printing Co., Ltd., Japan

[21] Appl. No.: 09/177,797

[22] Filed: Oct. 23, 1998

[30] Foreign Application Priority Data

Oct. 28, 1997 [JP] Japan .................................... 9-311139

[51] Int. Cl.[7] .............................. B32B 33/00; B32B 9/00

[52] U.S. Cl. ......................... 428/41.8; 428/352; 428/343; 428/354; 428/156; 428/202

[58] Field of Search .................................... 428/41.8, 352, 428/354, 343, 156, 202

[56] References Cited

U.S. PATENT DOCUMENTS

| | | | |
|---|---|---|---|
| 4,713,273 | 12/1987 | Freedman | 428/40 |
| 5,010,352 | 4/1991 | Takei et al. | 346/76 |
| 5,260,256 | 11/1993 | Takahara | 503/227 |
| 5,650,253 | 7/1997 | Baker | 430/119 |
| 5,733,698 | 3/1998 | Lehman et al. | 430/66 |
| 5,820,957 | 10/1998 | Schroeder | 428/40.1 |

*Primary Examiner*—Terrel Morris
*Assistant Examiner*—Sharmistha Gupta
*Attorney, Agent, or Firm*—Parkhurst & Wendel, L.L.P.

[57] ABSTRACT

A lamination-type image receiving sheet having excellent storage stability is provided. The image receiving sheet comprises: an image receiving substrate; and a pressure-sensitive adhesive layer and a release resin film provided in that order on the image receiving substrate on its side opposite to the image receiving surface. The image receiving substrate is in the form of a resin film. The surface roughness (Ra) of the release resin film on its side opposite to the pressure-sensitive adhesive layer is in the range of 0.2 to 0.8 μm.

4 Claims, 1 Drawing Sheet

IMAGE-RECEIVING SHEET

TECHNICAL FIELD

The present invention relates to an image-receiving sheet, and more particularly to an image-receiving sheet that enables the formation of images, letters or the like by thermal ink transfer (hot-melt transfer) and, at the same time, can be easily applied to various objects.

BACKGROUND OF THE INVENTION

In recent years, thermal ink transfer has been used for printing output data of computers, word processors and the like. In general, in the formation of images, letters and the like by the thermal ink transfer, a thermal transfer sheet, formed by coating a thermally transferable ink onto a substrate in the form of a 2 to 20 $\mu$m-thick polyethylene terephthalate film to form a thermally transferable ink layer, is provided, and the thermal transfer sheet is heated by means of a thermal head from the backside of the substrate to transfer the thermally transferable ink layer onto an image-receiving sheet.

Among image receiving sheets used in the formation of images, letters and the like by the thermal ink transfer are those that, after formation of images, letters and the like, are applied to other objects. In this type of image receiving sheets, a pressure-sensitive adhesive layer and a release sheet are laminated onto an image receiving substrate on its side remote from an image receiving surface, and, after the formation of images, letters and the like by thermal ink transfer, the release sheet is separated, followed by application to other object through the pressure-sensitive adhesive layer.

In the conventional image receiving sheet, the release sheet comprises paper which has been subjected to release treatment. Therefore, the image receiving surface of the image receiving substrate has low surface smoothness due to influence of surface irregularities of the release sheet. This is likely to cause dropouts or voids at the time of transfer. Further, the image receiving sheet, when used after storage under high temperature and high humidity conditions, unfavorably absorbs moisture and is deformed, resulting in lowered print quality.

DISCLOSURE OF THE INVENTION

Under the above circumferences, the present invention has been made, and an object of the present invention is to provide an application(sticking)-type image receiving sheet that can yield high-quality prints and possesses excellent storage stability.

The above object of the present invention can be attained by an image receiving sheet comprising: an image receiving substrate of a resin film; and a pressure-sensitive adhesive layer and a release resin film provided in that order on the image receiving substrate on its side opposite to the image receiving surface, the surface roughness (Ra) of the release resin film on its side opposite to the pressure-sensitive adhesive layer being in the range of 0.2 to 0.8 $\mu$m.

In the image receiving sheet having the above constitution according to the present invention, the release resin film on its pressure-sensitive adhesive layer side has excellent flatness, and the flatness of the release resin film can prevent inclusion of air at the time of lamination of the release resin film onto the image receiving substrate through the pressure-sensitive adhesive layer and consequently can render the image receiving surface of the image receiving substrate smooth. Further, the surface roughness of the release resin film on its side remote from the pressure-sensitive adhesive layer permits air, which had penetrated into between the image receiving sheets when the image receiving sheet was stored in a rolled or laminated state, to be surely released.

BEST MODE FOR CARRYING OUT THE INVENTION

Embodiments of the present invention will be described with reference to the accompanying drawings.

Figure 1:
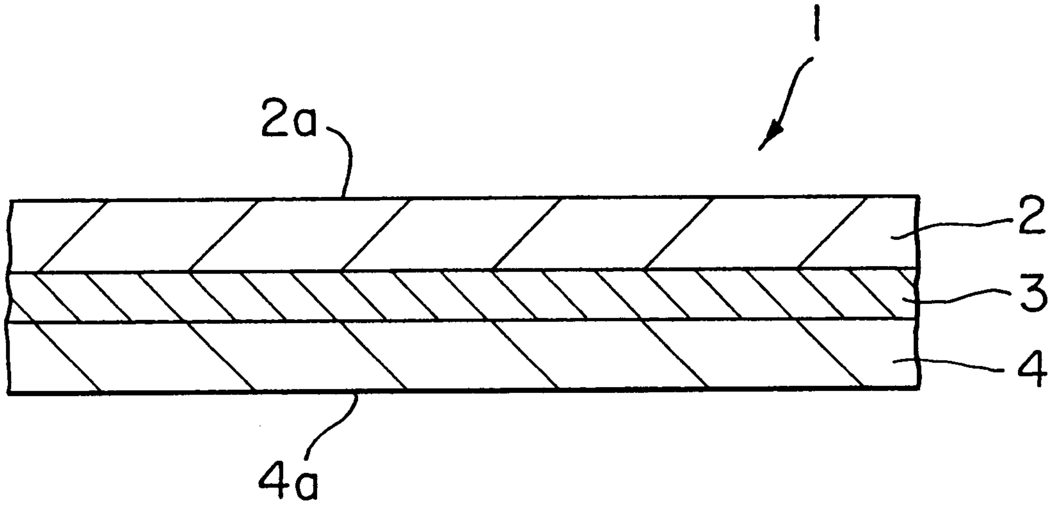
FIG. 1 is a schematic cross-sectional view showing one embodiment of the image receiving sheet of the present invention.

FIG. 1 is a schematic cross-sectional view showing one embodiment of the image receiving sheet of the present invention. In FIG. 1, an image receiving sheet 1 of the present invention comprises: an image receiving substrate 2; and a pressure-sensitive adhesive layer 3 and a release resin film 4 provided in that order on the image receiving substrate 2 on its side opposite to the image receiving surface 2*a*.

The image receiving substrate 2 constituting the image receiving sheet 1 according to the present invention is in the form of a resin film. Specific examples of resin films usable herein include: polyolefin resin films, such as films of polyethylene and polypropylene; polyester resin films, such as films of polyvinyl chloride, polyvinylidene chloride, polyvinyl acetate, vinyl chloride/vinyl acetate copolymer, polyacrylic ester, and polystyrene; polyester resin films, such as films of polyethylene terephthalate and polybutylene terephthalate; polyamide films; polyamide films; films of copolymers of olefins, such as ethylene and propylene, with other polymerizable monomers; films of ionomers; films of cellulosic resins, such as ethylcellulose and cellulose acetate; and polycarbonate resin films. The thermoplastic resin film 1 preferably has a glass transition temperature in the range of 50 to 100° C. A glass transition temperature below 50° C. is unfavorable from the viewpoint of storage stability. In this case, when the image receiving sheets 1 are stacked together, blocking is likely to occur. On the other hand, when the glass transition temperature exceeds 100° C., the adhesion of the thermally transferable ink is disadvantageously so low that a large amount of energy is required at the time of image formation, or otherwise fastness properties of printed images is unsatisfactory.

The thickness of the image receiving substrate 2 may be suitably determined by taking into consideration applications of the image receiving sheet 1, applicability of the sheet after the separation of the release resin film 4 and the like. For example, the thickness may be in the range of 30 to 120 $\mu$m. The image receiving substrate 2 may, if necessary, contain colorants, additives, stabilizers and the like. Examples of colorants usable herein include: colorants for white, such as calcium carbonate and titanium oxide; colorants for black, such as carbon black; and colorants for other colors, such as red, blue, yellow and other pigments. Additives and stabilizers usable herein include plasticizers, such as phthalic acid and polyester plasticizers, ultraviolet absorbers, such as organic and inorganic ultraviolet absorbers, and lubricants, such as metal soaps.

The pressure-sensitive adhesive layer 3 constituting the image receiving sheet 1 according to the present invention may be formed of synthetic resins, naturally occurring resins, rubbers, waxes or the like. Specific examples thereof include: synthetic resins, for example, cellulose derivatives, such as ethylcellulose and cellulose acetate propionate; styrene resins, such as polystyrene and poly-α-methylstyrene, acrylic resins, such as polymethyl methacrylate and polyethyl acrylate, vinyl resins, such as polyvinyl chloride, polyvinyl acetate, vinyl chloride/vinyl acetate copolymer, polyvinyl butyral, and polyvinyl acetal, polyester resins, polyamide resins, epoxy resins, polyurethane resins, ionomers, ethylene/acrylic acid copolymers, and ethylene/acrylic ester copolymers, and derivatives of naturally occurring resins and synthetic resins, for example, tackifiers, such as rosins, rosin-modified maleic resins, and ester gums, polyisobutylene rubbers, butyl rubbers, styrene butadiene rubbers, butadiene acrylonitrile rubbers, polyamide resins, and polyolefin chlorides.

The pressure-sensitive adhesive layer 3 may be formed of a composition comprising at least one of the above materials. The thickness of the pressure-sensitive adhesive layer 3 may be determined by taking into consideration required adhesive properties, handleability and the like. In general, however, the thickness is preferably about 20 to 80 μm.

The release resin film 4 constituting the image receiving sheet 1 according to the present invention may be a synthetic resin film, a synthetic paper or the like. Resin films as described above in connection with the image receiving substrate 2 may be used as the synthetic resin film 4. Synthetic papers usable herein include papers prepared by adding fillers to polyolefin resins, extruding the mixtures, and stretching the extrudates and papers prepared by coating resin films, such as polyolefin, polystyrene, or polyester films, with mixtures comprising fillers and binders.

The surface roughness (Ra) of the release resin film 4 on its side 4*a* opposite to the pressure-sensitive adhesive layer 3 is in the range of 0.2 to 0.8 μm, preferably 0.3 to 0.6 μm. The term "surface roughness (Ra)" used herein means a mean value of an absolute value of the deviation between the center line of the roughness curve and the roughness curve (JIS B 0601). The release resin film 4 having the above surface roughness (Ra) may be prepared, for example, by a method which comprises adding a filler, such as calcium carbonate, titanium oxide, or clay to a synthetic resin, extruding the mixture, and stretching the extrudate, or by a method which comprises creating fine irregularities on one side 4*a* of the release resin film by a sandblasting method, a chemical method or the like.

The thickness of the release resin film 4 may be properly determined in the range of 25 to 100 μm. Since the release resin film 4 on its side 4*a* opposite to the pressure-sensitive adhesive layer 3 has the above surface roughness (Ra), the carriability of the image receiving sheet 1 in a thermal transfer apparatus is improved. Further, in this case, when the image receiving sheet 1 is stored in a rolled or stacked state, air, which had penetrated into between the image receiving sheets, is surely released. This can effectively prevent unfavorable phenomena caused by air inclusion, such as deformation of the image receiving substrate 2.

On the other hand, the release resin film 4 on its pressure sensitive adhesive layer 3 side has excellent flatness, and the flatness of the release resin film 4 can prevent inclusion of air at the time of lamination of the release resin film 4 onto the image receiving substrate 2 through the pressure-sensitive adhesive layer 3 and consequently can render the image receiving surface 2*a* of the image receiving substrate 2 smooth.

Figure 2:
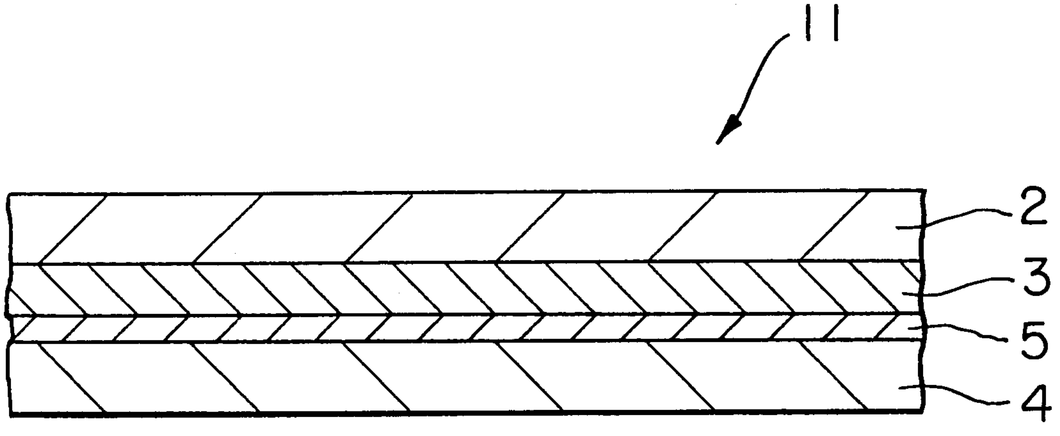
FIG. 2 is a schematic cross-sectional view showing another embodiment of the image receiving sheet of the present invention.

FIG. 2 is a schematic cross-sectional view showing another embodiment of the image receiving sheet according to the present invention. In FIG. 2, an image receiving sheet 11 of the present invention comprises a release layer 5 between the pressure-sensitive adhesive layer 3 and the release resin film 4. All the elements constituting the image receiving sheet 11 except for the release layer 5, that is, the image receiving substrate 2, the pressure-sensitive adhesive layer 3, and the release resin film 4 are the same as those for the image receiving sheet 1.

The release layer 5 constituting the image receiving sheet 11 functions to facilitate the separation between the pressure-sensitive adhesive layer 3 and the release resin film 4 and may be formed of a silicone release agent composed mainly of polymethylsiloxane, or alternatively may be formed of a polyolefin or the like. The thickness of the release layer 5 may be preferably in the range of 0.1 to 0.5 μm.

The following examples further illustrate the present invention.

EXAMPLES

A 38 μm-thick polyethylene terephthalate (PET) film (Lumirror T-60, manufactured by Toray Industries, Inc. ) was provided. One side of the PET film was sandblasted to create fine irregularities. Thus, a release resin film A was formed. Fine irregularities were chemically created on one side of a PET film of the same type as used above. Thus, a release resin film B was formed. Further, a 38 μm-thick white polyethylene terephthalate (PET) film with both sides thereof being matte (Lumirror E20, manufactured by Toray Industries, Inc.) was provided as a release resin film C. The surface roughness (Ra) of the matte surface (which had been subjected to treatment for creating fine irregularities) was measured with Surfcom 570-3DF, manufactured by Tokyo Seimitsu Co., Ltd. The results are summarized in Table 1 below.

A commercially available pressure-sensitive adhesive was coated onto the release resin films (release resin films A, B, and C) each in its flat surface side by roll coating or the like followed by drying to form a pressure-sensitive adhesive layer (thickness about 30 μm).

Separately, a polyvinyl chloride resin (PVC) having the following composition was mixed and milled and calendered to form a 90 μm-thick sheet. Thus, a polyvinyl chloride resin (PVC) film A as an image receiving substrate was prepared.

(Composition of polyvinyl chloride resin (PVC) A

| | |
|---|---|
| Vinyl chloride resin (Zeon 121, manufactured by Nippon Zeon Co., Ltd.) | 100 pts. wt. |
| Titanium oxide | 35 pts. wt. |
| Polyester plasticizer (W-305EL, manufactured by Dainippon Ink and Chemicals, Inc.) | 30 pts. wt. |
| Calcium stearate | 1 pt. wt. |

The polyvinyl chloride resin (PVC) film A was laminated onto the pressure-sensitive adhesive layer of the release resin films (release resin films A, B, and C). Thus, image receiving sheets (Examples 1 to 3) were obtained.

A 90 μm-thick polyvinyl chloride resin (PVC) film containing a large amount of a plasticizer was prepared as an image receiving substrate using a polyvinyl chloride resin (PVC) B having the following composition. An image receiving sheet (Example 4) was prepared in the same manner as in Example 1, except that this polyvinyl chloride resin (PVC) film and the release resin film C were used.

(Composition of polyvinyl chloride resin (PVC) B)

| | |
|---|---|
| Vinyl chloride resin (Zeon 121, manufactured by Nippon Zeon Co., Ltd.) | 100 pts. wt. |
| Titanium oxide | 35 pts. wt. |
| Polyester plasticizer (W-305EL, manufactured by Dainippon Ink and Chemicals, Inc.) | 40 pts. wt. |
| Calcium stearate | 1 pt. wt. |

A 90 μm-thick polyvinyl chloride resin (PVC) film C containing a small amount of a plasticizer was prepared as an image receiving substrate using a polyvinyl chloride resin (PVC) C having the following composition. An image receiving sheet (Example 5) was prepared in the same manner as in Example 1, except that this polyvinyl chloride resin (PVC) film and the release resin film C were used.

(Composition of polyvinyl chloride resin (PVC) C)

| | |
|---|---|
| Vinyl chloride resin (Zeon 21, manufactured by Nippon Zeon Co., Ltd.) | 100 pts. wt. |
| Titanium oxide | 35 pts. wt. |
| Polyester plasticizer (W-305EL, manufactured by Dainippon Ink and Chemicals, Inc.) | 20 pts. wt. |
| Calcium stearate | 1 pt. wt. |

For comparison, an image receiving sheet (Comparative Example 1) was prepared in the same manner as in Example 1, except that a release paper (glassine paper) was used instead of the release resin film A.

An image receiving sheet (Comparative Example 2) was prepared in the same manner as in Example 1, except that a PET film, which had not been subjected to treatment for creating fine irregularities, was used instead of the release resin film A.

Next, a coating liquid, for a release layer, having the following composition was coated onto one side of a 4.5 μm-thick polyethylene terephthalate (PET) film by gravure coating at a coverage of 0.5 $g/m^2$ on a solid basis, and the coating was dried to form a release layer. A coating liquid, for an ink layer, having the following composition was coated onto the release layer by gravure coating at a coverage of 1.0 $g/m^2$ on a solid basis, and the coating was dried to form an ink layer. A coating liquid, for an adhesive layer, having the following composition was coated onto the ink layer by gravure coating at a coverage of 0.5 $g/m^2$ on a solid basis, and the coating was dried to form an adhesive layer. A coating liquid, for a backside layer, having the following composition was coated onto the other side of the PET film by gravure coating at a coverage of 1.5 $g/m^2$ on a solid basis, and the coating was dried to form a backside layer. Thus, a thermal transfer sheet was prepared.

(Composition of coating liquid for release layer)

| | |
|---|---|
| Carnauba emulsion (WE-95 manufactured by Konishi Co., Ltd.) | 50 pts. wt. |
| Isopropyl alcohol | 25 pts. wt. |
| Water | 25 pts. wt. |

(Composition of coating liquid for ink layer)

| | |
|---|---|
| Carbon black | 8 pts. wt. |
| Chlorinated polypropylene | 14 pts. wt. |
| Polyethylene wax | 0.7 pt. wt. |
| Toluene/methyl ethyl ketone (weight ratio = 1/1) | 77 pts. wt. |

(Composition of coating liquid for adhesive layer)

| | |
|---|---|
| Carnauba wax emulsion | 40 pts. wt. |
| Ethylene/vinyl acetate copolymer (min. film-forming temp. = 80° C. | 10 pts. wt. |
| Isopropyl alcohol/water (weight ratio = 2/1) | 50 pts. wt. |

(Composition of coating liquid for backside layer)

| | |
|---|---|
| Styrene/acrylonitrile copolymer (Cevian AD, manufactured by Daicel Chemical Industries, Ltd.) | 6.0 pts. wt. |
| Linear saturated polyester (Elitel UE3200, manufactured by Unitika Ltd.) | 0.3 pt. wt. |
| Zinc stearyl phosphate (TBT1830, manufactured by Sakai Chemical Co., Ltd.) | 3.0 pts. wt. |
| Urea resin crosslinked powder (manufactured by Nippon Kasei Chemical Co., Ltd., particle diameter = 0.14 μm) | 3.0 pts. wt. |
| Melamine resin crosslinked powder (Epostar S, manufactured by Nippon Shokubai Kagaku Kogyo Co., Ltd., particle diameter = 0.3 μm) | 1.5 pts. wt. |
| Toluene/methyl ethyl ketone (weight ratio = 1/1) | 86.2 pts. wt. |

The image receiving sheets (Examples 1 to 5 and Comparative Examples 1 and 3) were stored in a roll form under environmental conditions of 45° C. and 85% RH for 200 hr. Before and after the storage under the above conditions, the thermal transfer sheet was put on top of each of the image receiving sheets so that the image receiving substrate faced the hot-melt ink layer. Printing was then carried out under the following conditions. The quality of the resultant prints was evaluated. The results are summarized in Table 1 below.

(Printing conditions)

Printing energy: 0.6 ml/dot (200 dpi)

Printing pressure: 4 kg/200 mm

Printing speed: 10 mm/sec (Evaluation of quality of prints)

The prints were visually evaluated for dropouts and voids according to the following criteria.

Evaluation criteria

○: Dropouts/voids not created at all

Δ: Dropouts/voids slightly created

X: Noticeable dropouts/voids created

TABLE 1

| Image-receiving sheet | Image-receiving substrate | Release resin film (surface roughness, Ra) | Print quality | |
|---|---|---|---|---|
| | | | Before storage | After storage |
| Ex. 1 | PVC-A | A (0.8 μm) | ○ | ○ |
| Ex. 2 | PVC-A | B (0.2 μm) | ○ | ○ |
| Ex. 3 | PVC-A | C (0.4 μm) | ○ | ○ |

TABLE 1-continued

| Image-receiving sheet | Image-receiving substrate | Release resin film (surface roughness, Ra) | Print quality | |
|---|---|---|---|---|
| | | | Before storage | After storage |
| Ex. 4 | PVC-B | C (0.4 μm) | ○ | ○ |
| Ex. 5 | PVC-C | C (0.4 μm) | ○ | ○ |
| Comp.Ex. 1 | PVC-A | Paper | Δ | X |
| Comp.Ex. 2 | PVC-A | PET | ○ | X |

As is apparent from Table 1, the image receiving sheets (Examples 1 to 5) of the present invention could provide good print quality both before and after storage under environmental conditions of 45° C. and 85% RH for 200 hr.

By contrast, for the image receiving sheet using a release paper (Comparative Example 1), the print quality was somewhat poor before the storage, and the print formed after the storage had remarkably lowered print quality due to moisture absorption of the release paper.

The thermal transfer sheet using as the release resin film a PET film (Comparative Example 2), which had not been subjected to treatment for creating fine irregularities, provided good print quality before the storage. In this image receiving sheet, however, the print formed after the storage had remarkably lowered print quality due to deformation (in a crater form) of the image receiving substrate created by the influence of air which had penetrated into between image receiving sheets in a roll form during the storage.

The thermal transfer sheet using glassine paper as the image receiving substrate (Comparative Example 3) provided low print quality and created dropouts and voids even before the storage and, after the storage, provided further lowered print quality due to moisture absorption of the image receiving substrate.

As is apparent from the detailed description, the image receiving sheet according to the present invention comprises: an image receiving substrate; and a pressure-sensitive adhesive layer and a release resin film provided in that order on the image receiving substrate on its side opposite to the image receiving surface, wherein image receiving substrate is in the form of a thermoplastic resin film and the surface roughness (Ra) of the release resin film on its side opposite to the pressure-sensitive adhesive is in the range of 0.2 to 0.8 μm. By virtue of this constitution, the flatness of the release resin film on its pressure-sensitive adhesive layer side and the flatness of the release resin film can prevent inclusion of air at the time of lamination of the release resin film onto the image receiving substrate through the pressure-sensitive adhesive layer and consequently can render the image receiving surface of the image receiving substrate smooth. This can prevent the creation of dropouts, voids and the like at the time of transfer to provide good print quality. Further, the image receiving sheet, even when stored under high temperature and high moisture environmental conditions, does not cause any deformation of the release resin film, and, hence, stable print quality can be maintained. Furthermore, the surface roughness of the release resin film on its side remote from the pressure-sensitive adhesive layer permits air, which had penetrated into between the image receiving sheets when the image receiving sheet was stored in a rolled or laminated state, to be surely released. This can effectively prevent unfavorable phenomena, such as deformation of the image receiving substrate caused by inclusion of air, and consequently can realize good printed images.

What is claimed is:

1. An image-receiving sheet comprising:

an image receiving substrate of a resin film; and a pressure-sensitive adhesive layer and a release resin film provided in this order on the image receiving substrate on its side opposite to an image receiving surface, the surface roughness (Ra) of the release resin film on its side opposite to the pressure-sensitive adhesive layer being in the range of from 0.2 to 0.8 μm.

2. The image-receiving sheet according to claim 1, wherein said surface roughness (Ra) is in the range of from 0.3 to 0.6 μm.

3. The image-receiving sheet according to claim 1, wherein the image receiving substrate is in the form of a thermoplastic resin film having a glass transition temperature of from 50 to 100° C.

4. The image-receiving sheet according to claim 1, which further comprises a release layer between the pressure-sensitive adhesive and the release resin film.

* * * * *